Oct. 20, 1931.    L. STOLTENBERG    1,828,261
COMBINED POTATO DIGGER AND SORTER
Filed March 28, 1930
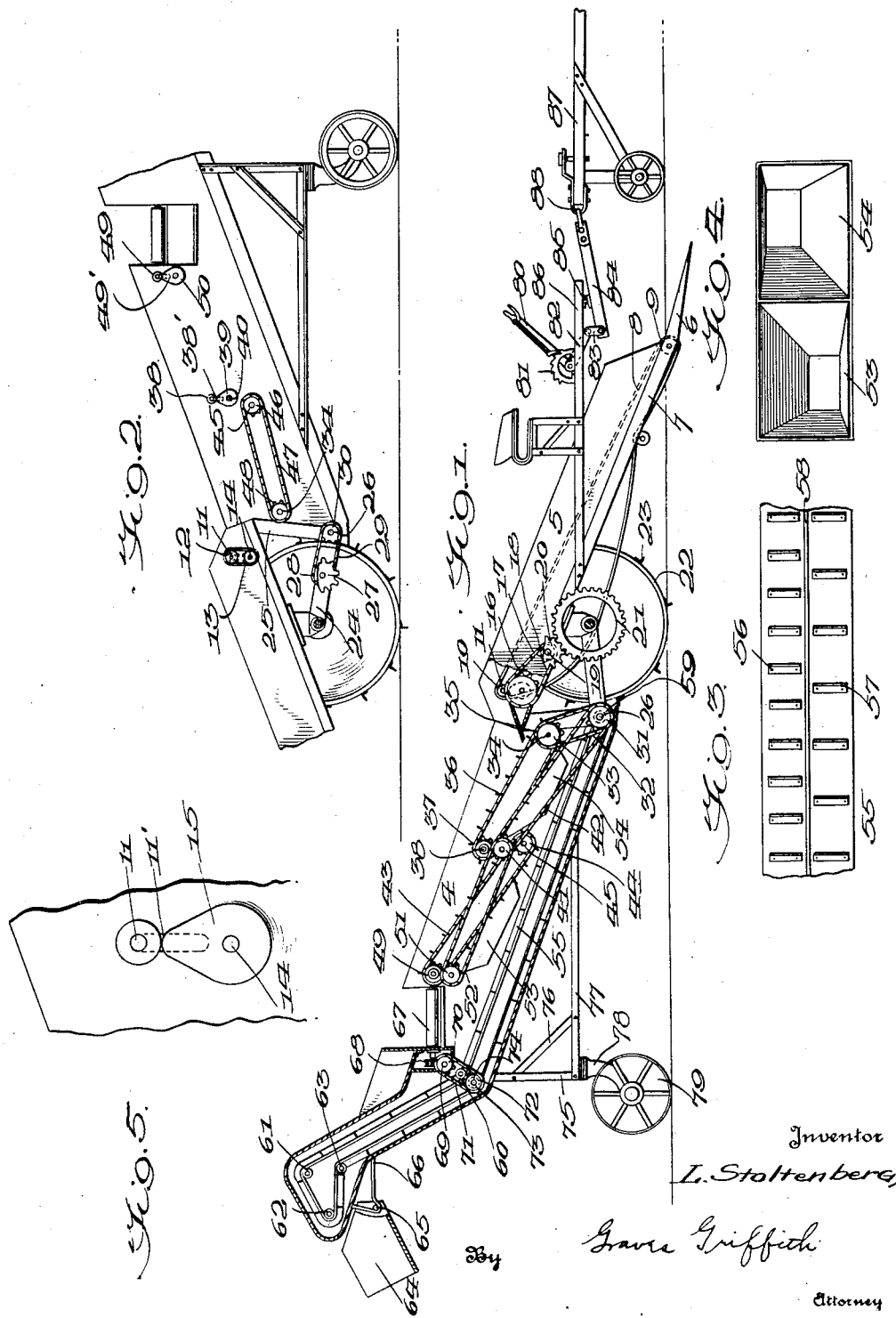
Inventor
L. Stoltenberg,
By Gravis Griffith
Attorney Patented Oct. 20, 1931

1,828,261

UNITED STATES PATENT OFFICE

LOUIS STOLTENBERG, OF OAKLAND, CALIFORNIA

COMBINED POTATO DIGGER AND SORTER

Application filed March 28, 1930. Serial No. 439,824.

The present invention relates to improvements in machines for harvesting potatoes, and more particularly to those of a combination character adapted to function in diverse directions.

The object of the invention is to provide a potato-digging machine adapted for digging potatoes, separating them from the vines and dirt and, while delivering them rearwardly to sort them, as to size, and direct them to longitudinally arranged compartments, borne by a conveyor-belt, to a final point of discharge.

Referring to the accompanying drawings, forming a part of this specification, and in which, similar characters of reference refer to like parts throughout:

Figure 1 is a side elevation of the machine, with portions broken away and partly in section;

Figure 2 is a side elevation of a portion of the machine, taken from the opposite side from that shown in Figure 1, the wheel and bull gears being omitted in order to show the remaining parts clearly;

Figure 3 is a plan view of the endless conveyor belt, showing the transversely arranged cleats together with the longitudinally arranged partitioning means;

Figure 4 is a top plan of the two chutes adapted to receive and direct the assorted articles to the proper sections on the conveyor belt;

Figure 5 is a fragmentary end elevation showing the mounting of one of the operating shafts.

On the drawings, in which like reference characters indicate like parts on all of the views thereof, 6 indicates the plow which is fixedly secured to the frame 7. 8 indicates the endless conveyor chain which passes over and is supported by a sprocket 9, which chain is driven by the sprocket 10 carried by the shaft 11. The shaft 11 is driven by the sprocket 12, secured thereto which is in turn driven through the medium of a chain by the sprocket 13 carried by the shaft 14. The shaft 11 rests loosely on a cam 15 carried also by the shaft 14, the ends of the shaft 11 being mounted in slots 11' in the frame. The shaft 14 is driven by a sprocket 16 which in turn is driven through the medium of the chain 17 by the sprocket 18 which is secured to the shaft 19, the shaft 19 being driven by the gear 20. The gear 20 is driven by the bull gear 21 secured to the wheel 22 which carries the wheel-grouse 23.

The sorter and conveyor are connected to the machine 5 by the bars 24 and 25 and a shaft 26. The shaft 26 functions as a pivot for the sorter 4 and the machine 5.

The sorter 4 is driven by the bull gear 21 (see Figure 1) attached to the wheel 22. The wheel 22 also drives a gear 27 (see Figure 2) which in turn drives a sprocket 28 and a chain 29, the chain 29 driving the sprocket 30 which is mounted on the shaft 26.

A double sprocket 31, carried by the shaft 26 drives the chain 32 which drives the sprocket 33 borne by the shaft 34. The shaft 34 through the medium of the sprocket 35 drives the sorter chain 36 which is operatively connected to the sprocket 37. The sprocket 37 is carried by the shaft 38, the shaft 38 whose ends are mounted in slots 38' in the frame transmitting a vibratory vertical motion to the chain through the action of a cam 39 (see Figure 2). The cam 39 is mounted on the shaft 40 which shaft is driven by the double sprocket 41, the sprocket 41 being operatively connected to the chain 42 which is driven by the sprocket 31 mounted on the shaft 26.

A second sorter chain 43 is driven by the sprocket 44 mounted on a shaft 45, which latter is driven by the sprocket 46, the latter being driven by a chain 47 which in its turn is driven by a sprocket 48. The sprocket 48 is secured on the shaft 34, this latter being driven by the sprocket 33.

The sorter chain 43 is given a vibratory vertical motion through the shaft 49 which rests loosely upon a cam 50, the ends of the shaft being mounted in slots 49' in the frame.

The cam is carried by the shaft driven by the sprocket 51 operatively connected with the chain 52 which is driven by the double sprocket 41.

The chains 36 and 43 are each provided with transversely spaced cross-members.

Below the sorter chains 36 and 43, are dividing chutes 53 and 54, as shown in Figure 4, these chutes being above the conveyor belt 55, shown in Figure 3. The conveyor belt is provided with transverse cleats 56 and 57 as shown in Figure 3. Between the cleats 56 and 57 is a separating means 58 adapted to divide the conveyor belt, Figure 3, longitudinally into separate sections constituting two distinct carrying paths. The conveyor belt 55 passes over a drum 59 carried by the shaft 26, under a roller on the shaft 60 and over rollers 61, 62 and 63 to the discharge chute 64, this chute 64 being held in place by means of pins 65 resting in the brace 66 and providing a means for the emptying of the assortment into separate troughs.

In the operation of the device, the vines and other débris travel over the chain 8 onto the chain 36 and from there to the sorter chain 43 and on to the endless transversely moving belt 67, which conveyor belt is driven by a worm gear 68 carried by the shaft 69. The shaft 69 is driven by a sprocket 70, the latter being driven by the chain 71 which is operatively connected to the sprocket 72 mounted on the shaft 73. The shaft 73 is driven by the roller 74, which latter is driven by the conveyor belt 55. The articles to be sorted, in this particular instance, potatoes, are carried rearwardly and upwardly by the endless conveyor belt 55, the small potatoes by the cleats 56 and the larger potatoes by the cleats 57, being thus completely separated by the partitioning means 58 mounted above the belt and interposed between the two series of cleats 56 and 57. The potatoes are finally discharged into the chute 64.

The rear of the sorting machine is supported by a member 75, as shown in Figure 1, which is braced by members 76 and 77. The wheel supporting member 78 is secured to the supporting frame 75, 76 and 77, the wheel being indicated at 79.

The plow member 6 is raised or lowered by the lever 80 which is held in place by the ratchet 81 connecting the arm 82 to the link 83. The link 83 is connected to the draw-bar 84, which latter is fulcrumed at 85 to the frame 86, the draw-bar being connected to the truck frame 87 by a link 88.

The rotation of the sprockets 9 and 10 causes the operation of the chain 8 conveying the material from the leading plow 6, the chain 8 running loosely on these sprockets as is clearly shown in Figure 1. The sprocket 10, mounted on the shaft 11, vibrates with it in a vertical direction since the shaft 11 is loosely mounted in the frame and vibrated by the cam 15. While the shaft 11 is shown with its ends riding in the slots in the frame, this vibration might be accomplished by any other desired construction which would permit of the vertical movement of the shaft by its cam. While it is true that the sprocket 10, and the cam 15 rotate in a counter clockwise direction, the cam therefore tending to rotate the shaft in the opposite direction from its direction of rotation by the sprocket, the frictional engagement of the cam 15 with the shaft 11 is not sufficient to overcome the positive rotation caused by the chain and sprocket nor to interfere with the counter-clockwise movement of the shaft. The shaft merely rests on the cam, being held thereagainst solely by its weight and therefore the only effect the cam will have upon the movement of the shaft will be to vibrate it in a vertical plane.

The shafts 38 and 49 are mounted in a manner similar to the shaft 11 and are therefore vibrated by their respective cams.

It will thus be seen that I have provided a novel and improved digging and sorting machine which may be either tractor or horse drawn and which will dig the potatoes and separate the vines and débris therefrom and sort the larger from the smaller potatoes.

While I have described my improved machine as being designed for the purpose of digging and separating potatoes, it is apparent that it is capable of use for digging and sorting other vegetables.

Having thus described my invention, I claim, and desire to secure by Letters Patent of the United States, the following:

1. A mechanism of the type described comprising a digging plow, an endless vibrating flexible chain associatively mounted above and discharging onto an endless vibratable sorting chain, a second endless vibratable sorting chain onto which first named sorting chain discharges, a transverse continuously moving belt onto which said second named sorting chain discharges, a series of directing chutes below the endless sorting chains and above and discharging onto a flexible continuously moving conveyor-belt having two distinct carrying paths made up of cleats separated by a partitioning means.

2. A machine of the type described having a digging plow, a rearwardly translating vibrating endless chain, a rearwardly translating vibrating endless sorting chain having transverse spaced members discharging onto a second rearwardly translating vibrating endless sorting chain having transverse spaced members discharging onto a flexible endless transverse belt, and a directing chute below each rearwardly translating vibrating endless sorting chain discharging onto a flexible endless conveyor-belt having separate and distinct conveying paths.

3. The combination of a digger-frame, the digging plow on the forward end of said frame, an endless vibrating flexible chain, an endless vibrating sorting chain having transversely spaced cross-members, a transversely and continuously moving belt, and a continuously moving conveyor-belt divided longitudinally into two carrying paths, each of said paths bearing transversely arranged cleats.

4. The combination in a potato digger, of a frame, a series of endless conveyors associatively mounted to travel in said frame, said conveyors comprising an endless vibrating flexible chain associatively mounted above and discharging onto an endless vibrating sorting chain carrying transversely spaced members, a second endless sorting chain and a continuously moving conveyor-belt divided longitudinally into two distinct carrying paths having each transversely arranged cleats.

5. The combination in a potato digger, of a frame, a series of endless conveyors associatively mounted to travel in said frame, said conveyors comprising an endless vibrating flexible chain associatively mounted above and discharging onto an endless vibrating sorting chain carrying transversely spaced members, a second endless sorting chain, a transverse continuously moving belt and a continuously moving conveyor-belt divided longitudinally into two distinct carrying paths having each transversely arranged cleats, and chutes adapted to receive potatoes as assorted by said sorting chains and to direct them respectively into said carrying paths.

6. The combination in a potato digger and sorter, of a truck, a frame carrying an adjustable digging plow, a plurality of endless conveyors associatively mounted to travel in said frame, said conveyors comprising an endless vibrating flexible chain associatively mounted above and discharging onto an endless vibrating sorting chain carrying transversely spaced members, a second endless sorting chain and a continuously moving conveyor-belt divided longitudinally into two distinct carrying paths having each transversely arranged cleats, said conveyor-belt being adapted to discharge assorted potatoes to a receiving trough serving to divert these respectively into sacking means.

In testimony whereof I hereunto affix my signature.

LOUIS STOLTENBERG.